United States Patent Office 3,741,741
Patented June 26, 1973

3,741,741
PROCESS AND APPARATUS FOR THE PREPARATION OF SURFACE-MODIFIED GLASS RIBBON
Nobuyoshi Ohsato, Maizuru, Japan, assignor to Nippon Sheet Glass Co., Ltd., Osaka, Japan
Filed Aug. 17, 1970, Ser. No. 64,369
Claims priority, application Japan, Aug. 18, 1969, 44/65,209
Int. Cl. C03b 19/02
U.S. Cl. 65—99 A                5 Claims

ABSTRACT OF THE DISCLOSURE

This invention provides as improvement of the process for preparing a glass ribbon having modified properties by contacting the surface of a glass ribbon running continuously on a bath of molten metal with a glass-modifying molten alloy, and this improvement is characterized in that a molten alloy containing a glass surface-modifying metal in a maximum content is fed onto the surface of the glass ribbon flowing continuosly on the bath of molten metal.

---

Figure 1:
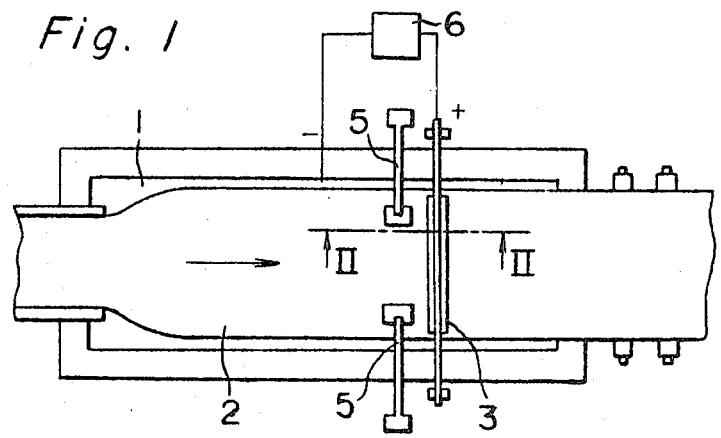

This invention relates to a process and an apparatus for the preparation of a surface-modified glass ribbon. More specifically, the invention relates to an improvement of the process for preparing a glass ribbon having modified properties by contacting the surface of a glass ribbon running continuously on a bath of molten metal with a glass-modifying molten alloy; wherein a molten alloy containing a glass surface-modifying metal in a maximum content is fed onto the surface of the glass ribbon flowing continuously on the bath of molten metal.

In the art of continuously preparing glass ribbon by feeding molten glass onto a bath of molten metal from a glass melting furnace and forwarding it on the bath, there has been recently developed a process for the continuous preparation of glass ribbon having modified properties which comprises contacting the glass ribbon on the bath with a molten alloy containing a metal capable of intruding into the glass to thereby cause modifications in the glass such as coloration and strengthening, passing an electric current through the glass between the bath of molten metal and the molten alloy, and thereby allowing said glass-modifying metal to intrude into the glass.

In this method, the molten alloy is usually held by surface tension on a supporting metal rod disposed close above the glass ribbon in the direction parallel to the glass ribbon and vertical to the flow of the glass ribbon, and in this state the molten alloy is allowed to contact the running glass ribbon. The metal capable of intruding into the glass and modifying the glass surface is usually used in the form of a molten alloy because a close contact of the metal with surface of the glass ribbon and a uniform intrusion of the metal in the glass requires that the metal be in the molten state. A certain limitation is, however, imposed on the temperature adopted for conducting the treatment of allowing the glass-modifying metal to intrude into the glass, because the making of glass ribbon by forwarding molten glass onto the molten metal bath requires some prescribed operational conditions. Accordingly, when a glass surface-modifying metal is used whose melting point is higher than the treatment temperature for intruding glass-modifying metal into the glass ribbon (which metal will be referred to as "additive metal" hereinbelow), it is impossible to contact the additive metal in the form of a melt of a simple substance with the glass ribbon. In order to keep the additive metal in the molten state at the glass ribbon treatment temperature, it is necessary to dissolve the additive metal into a second metal. This second metal is selected so that it has little effect on the intrusion of the additive metal into the glass and also little effect on the glass modifications such as coloration and strengthening. This metal must also form a fused and molten alloy with the additive metal at the glass ribbon treatment temperature (the second metal will be referred to as "solvent metal" hereinbelow).

When such molten alloy composed of the additive metal and the solvent metal is subjected on the surface of the glass ribbon to an electric current-passing treatment, the additive metal intrudes into the glass more quickly than the solvent metal and it frequently happens that the concentration of the additive metal in the molten alloy held on the above-mentioned supporting metal rod and having a contact with the glass surface is extremely lowered. For instance, in the case of a molten alloy composed of copper as the additive metal and lead as the solvent metal, copper is dissolved into the lead at a concentration of only several percent by weight at the treatment temperature usually in the range of 600–900° C. and copper intrudes into the glass at a rate twice as high as lead. In this case, the amount of copper in the alloy is rapidly reduced and the alloy becomes incapable of feeding copper into the glass. Accordingly, in order to prevent the reduction of the concentration of the additive metal in the alloy it is generally known to form the supporting metal rod from the same metal as the additive metal. The rod then acts as a source for feeding additional additive metal. In such case, however, the metal constituting the supporting rod is gradually eluded into the molten alloy and it is necessary to frequently exchange the supporting metal rod with a new one, which results in lowering of productivity, though the supporting metal rod is a consumption article. Accordingly, in order to maintain the productivity at high levels it is necessary to make the life of the supporting metal rod as long as possible and reduce the frequency of exchange thereof.

This invention is directed to the above-mentioned process for the preparation of a surface-modified glass ribbon which comprises feeding a molten alloy containing a glass surface-modifying metal (additive metal) on the upper surface of a glass ribbon running on a bath of molten metal, and passing an electric current through the glass between the molten alloy and the molten metal bath while keeping the molten alloy in contact with the upper surface of the glass ribbon. An object of this invention is to maintain the content of the additive metal in the molten alloy fed on the surface of the glass ribbon at a maximum level.

Another object of this invention is to prolong the life of the supporting metal rod used for holding the molten alloy on the glass ribbon.

In accordance with this invention there is provided an improvement of a process for the preparation of a surface-modified glass ribbon comprising the steps of feeding a molten glass on a bath of molten metal, forwarding continuously the glass in the form of a ribbon on the molten metal bath while keeping it in the plasticized condition, contacting the glass ribbon with a molten alloy disposed on the upper surface of the glass ribbon, said molten alloy being comopsed of (a) a glass surface-modifying metal which does not melt at temperatures for the treatment of contacting the glass ribbon with the molten alloy (additive metal) and (b) a metal which melts at the said contact treatment temperatures and is capable of dissolving the additive metal (a) therein at said temperatures (solvent metal), and passing an electric current through the glass between the molten alloy and the molten metal bath; said improvement comprising contacting the melt of the metal (b) or the molten alloy of metals (a) and (b) for a prescribed period of time with an eluting member maintained at a temperature approximating equal to said contact treatment temperatures, at least the surface portion of which is composed of the metal (a), to thereby elude out the metal (a) from the eluding member and form a molten alloy having a metal (a) concentration made higher than before the elution, and feeding the molten alloy on the upper surface of the glass ribbon.

The operation of feeding molten glass in the form of a ribbon on a bath of molten metal, for instance, molten tin or tin alloy, and forwarding the glass ribbon on the bath of molten metal while keeping the glass ribbon in the plasticized state is well known in the art, and in this invention the said operation is conducted under known conditions. The temperature at which the glass ribbon contacts the molten alloy depends on the glass ribbon-molding conditions, and in general, the contact temperature is in the range of 600–900° C. Accordingly, the additive metal (a) in the molten alloy to be used in this invention is a metal which does not melt at said temperature in the range of 600–900° C. but is capable of intruding into the surface portion of the glass ribbon and modifying the surface thereof by, for instance, coloring the glass surface or strengthening the glass surface. Metals such as manganese, chromium, iron, vanadium, cobalt, nickel, copper, silver and gold may be used for coloring the glass. For strengthening the glass and imparting thereto a resistance against corrosion metals such as silicon and titanium may be used.

As solvent metal (b) there may be used any metal, so long as it melts at the above-mentioned contact temperature in the range of 600–900° C. and is capable of dissolving the additive metal (a) therein at said temperature. In addition, it must not adversely affect the intended modification of the glass surface. Suitable examples of the solvent metal (b) are tin, bismuth and lead.

A suitable combination of the additive metal (a) and solvent metal (b) is determined in view of the desired modification, the glass ribbon treatment temperature and the solubility of the additive metal (a) in the solvent metal (b). Suitable examples of the combinations for attaining the objects of this invention are copper-lead (reddish grey coloration), copper-bismuth (reddish brown coloration), silverlead (yellowish grey coloration), silver-bismuth (yellowish coloration), cobalt-bismuth (blue coloration), silver-lead (yellowish grey coloration), silver- The molten alloy may contain, in addition to said additive metal (a) and solvent metal (b), another glass-modifying metal that melts at the glass ribbon treatment temperature, such as zinc, magnesium, aluminum and antimony, which can strengthen the glass or improve the corrosion resistance of the glass.

In this invention the content of the additive metal in the molten alloy fed to the surface of the glass ribbon is maintained at a maximum level, i.e., in the saturated condition at the treatment temperature. In order to attain this condition, a melt of the solvent metal (b) or a molten alloy of the solvent metal (b) and additive metal (a) is applied for a prescribed period of time to an eluding member maintained at a temperature approximating the above-mentioned treatment temperature. At least the surface portion of the eluding member is composed of the same metal as the additive metal (a), whereby the additive metal (a) in the surface portion of the eluding member is sufficiently dissolved in the melt of the solvent metal (b) or the molten alloy. Thus there is formed a molten alloy of the solvent metal (b) containing the additive metal in an amount approximating the saturation concentration at the glass ribbon treatment temperature.

The structure or configuration of the eluding member is determined so that the melt of the solvent metal (b) or molten alloy of the additive metal (a) and solvent metal (b) fed to the eluding member may be sufficiently contacted with the additive metal (a) constituting the surface portion of the eluding member. For example, a reservoir may be used where the contact is attained in the stationary condition and a screw tube may be used where the melt of the solvent metal (b) or molten alloy of the additive metal and solvent metal moves continuously while contacting the surface of the tube.

The molten alloy saturated with the additive metal (a) is then fed onto the surface of a glass ribbon advancing on a bath of molten metal and is allowed to contact the glass ribbon by known customary procedures.

The passing of an electric current can be easily performed by connecting the molten alloy with the positive side of an electric source and the metal bath with the negative side of the electric source and letting a direct electric current of 2–10 volts flow therebetween.

The process of this invention is suitably carried out by employing an apparatus for preparing a surface-modified glass ribbon which comprises a bath containing a molten metal for expanding molten glass in the form of a ribbon and supporting it thereon; a glass feeding mechanism for feeding the molten glass onto the bath of molten metal; a glass withdrawing mechanism for continuously forwarding the glass ribbon on the bath of molten metal and withdrawing the same from the bath and; a molten alloy supporting member disposed closely above the upper surface of the glass ribbon on the bath of molten metal in the direction traversing the glass ribbon to confine a molten alloy therein and contact the same with the glass ribbon. As described above, said alloy is composed of (a) a glass surface-modifying metal which does not melt at the temperature for contacting the glass ribbon with the molten alloy and (b) a metal which melts at said contact temperature and can dissolve the metal (a) therein. The apparatus also includes; an eluting member, at least the surface portion of which is composed of. The metal (a), said eluting member is located in the vicinity of said supporting member or upstream thereof and is disposed closely above the glass ribbon, where a melt of the metal (b) or molten alloy of metals (a) and (b) is contacted for a prescribed period of time with said eluding member to thereby elude out the metal (a) from the eluding member into the melt or molten alloy to form a molten alloy having a metal (a) concentration higher than before said contact. This alloy is then fed to the upper surface of the glass ribbon. Further included are a feeding mechanism for feeding the melt of the metal (b) or molten alloy of metals (a) and (b) to said eluting member; electrodes connected with the molten alloy confined in said supporting member and the bath of molten metal, respectively; and an electric source for passing an electric current through the glass between said electrodes.

The supporting member for supporting the molten alloy and contacting the same with the glass ribbon may be formed of any material, but it is preferable that it is composed of a material which is easily wet by the molten alloy. However, an electroconductive material is generally used so that the supporting member may also act as an electrode for passing an electric current to the molten alloy confined therein. For this purpose an electroconductive metal inert to the solvent metal (b) such as platinum may be used, but generally it is preferable that the supporting member is formed of the same metal as the additive metal (a). In this case, since the molten alloy containing the additive metal (a) at the saturation concentration or a concentration approximating the saturation concentration is fed to the supporting member, in this invention the elution of the metal constituting the supporting member is greatly reduced, and the life of the supporting member can be prolonged.

Further, since the concentration of the additive metal (a) in the molten alloy between the supporting member and the glass ribbon is always lower than the saturation concentration at the treatment temperature, it is possible to maintain the temperature of the eluting member a little higher than the treatment temperature and elute out the additive metal sufficiently so as to make the additive metal concentration higher than the saturation concentration at the treatment temperature. It is then possible to feed to the glass ribbon the molten alloy having such a composition as will cause solidification at the treatment temperature, because the alloy is rapidly dissolved in the molten alloy below the supporting member and becomes molten. Thus, the temperature of the eluting member may be equal to the treatment temperature or a little higher or lower than the treatment temperature. For instance, when the temperature of the eluding member is in the range of 100° C. lower than the treatment temperature to 100° C. higher than the treatment temperature, the object of this invention of prolonging the life of the supporting member can be attained. The eluding member can be equipped with a thermostat heater to adjust the temperature of the eluting member to temperatures approximating the temperature necessary for the additive metal (a) to intrude into the glass ribbon. In this way it is possible to mount the eluding member outside the bath of molten metal but it is advantageous and economical to mount the eluding member in the vicinity of the treatment area within the tank of the molten metal bath, whereby the eluding member can be maintained at a temperature approximating the treatment temperature and can be readily responsive to the change in the treatment temperature.

The rate of the molten alloy fed to the surface of the glass ribbon from the eluding member depends on the thickness of the glass to be produced, the degree of modification such as coloration, the kinds of components of the molten alloy and other factors, but in this invention the molten alloy is fed to the glass from the eluding member at a rate of several grams to many tens of grams per minute. The time and area required for contacting the melt of the metal (b) or molten alloy of metals (a) and (b) fed to the eluding member with the surface of the eluding member are varied to some extent depending on the kinds of metals, the feed rate of the melt or molten alloy and the temperature of the eluding member. In the example of a Cu-Pb alloy it is preferable that the contact time is from 10 seconds to 5 minutes and the contact area is in the range of 10 to 40 $cm.^2$. The advantage attained by the use of an eluding member formed of the same metal as the additive metal (a) in this invention resides in the fact that a molten alloy saturated with the additive metal (a) can be formed very easily. It may be considered that the treatment temperature is prescribed in advance and a molten alloy containing the additive metal (a) in such an amount as will result in an alloy saturated with the additive metal (a) at the prescribed treatment temperature is fed to the surface of the glass ribbon, but in this case the melting temperature of the alloy is greatly influenced by a slight change in the ratio of the additive metal (a). This disadvantage can be effectively overcome according to this invention.

An embodiment of this invention will now be described with reference to the accompanying drawings.

Figure 2:
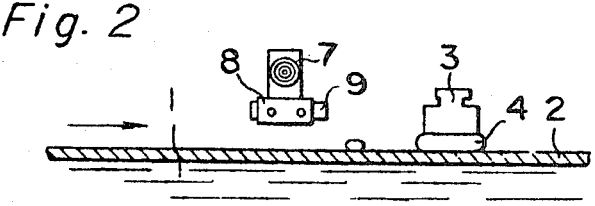
Figure 3:
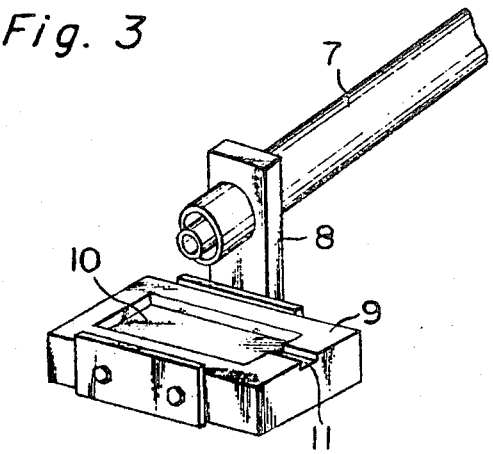

In the drawings, FIG. 1 is a plan diagram showing the arrangement of the apparatus to be used in this invention, FIG. 2 is a partially sectional side view taken along the line II—II of FIG. 1, and FIG. 3 is a perspective view illustrating an example of an eluding member used with this invention.

In this embodiment, the preparation of a reddish grey-colored glass ribbon using a molten alloy composed of copper as additive metal (a) and lead as solvent metal (b) is explained.

As is illustrated in FIGS. 1 and 2, molten glass having, for instance, the following composition:

|  | Percent by weight |
|---|---|
| $SiO_2$ | 72.0 |
| $Al_2O_3$ | 1.8 |
| CaO | 7.9 |
| MgO | 4.0 |
| $Na_2O$ | 14.0 |
| $K_2O$ | trace | is fed on a bath 1 of molten tin maintained at 1000° C. from a glass melting furnace (not shown), and is allowed to advance on the bath to continuously produce a glass ribbon 2. In this glass making apparatus, there are provided a supporting rod 3 composed of copper disposed close above the surface of the glass ribbon 2 in parallel thereto in the direction vertical to the flow of the glass ribbon to hold a copper-lead molten alloy 4 between the metal rod and the glass by means of surface tension; a member 5 for feeding the copper-lead molten alloy disposed upstream of the copper rod 3; an electric source 6 for letting an electric current flow between the supporting rod 3 and the bath 1 of molten tin; and wires distributing the electric current. The molten alloy-feeding member 5 comprises a conduit 7 for feeding a melt of lead or a copper-lead alloy having a lower concentration of molten copper, said conduit being composed of a double tube and penetrating the upper portion of the side wall of the bath 1 of molten tin and extending inwardly from the outside, and a copper reservoir 9 fixed to the outlet of the conduit 7 by means of a support 8. In this embodiment, when rodlike lead or an alloy of copper and lead is continuously inserted into the conduit 7 at a constant rate. The alloy or lead is heated in the portion of the conduit extending over the bath by means of the heat of the bath and is then fed in the molten state to the reservoir 9 via the outlet of the conduit 7. As illustrated in FIG. 3, the reservoir 9 comprises a pond 10 for storing the melt fed from the conduit and a groove 11 for dropping the molten alloy onto the surface of the glass. The melt in the pond 10 overflows into the groove 11 by the continuous supply of the melt from the conduit and the elusion of copper from the reservoir. The overflowing melt drops onto the surface of the running glass ribbon.

When the copper-lead alloy is used at a treatment temperature of 700° C., the alloy having a copper concentration higher than about 3% by weight copper precipitates as a solid is therefore not in the molten state. Accordingly, if the above-mentioned reservoir is not provided, a melt containing copper at a concentration of 2% by weight is fed directly onto the glass ribbon through the conduit to modify the surface of the glass ribbon. In this case the supporting rod is locally corroded at the point on which the molten alloy fed from the conduit hits. Accordingly, the life of the supporting rod is only about 8 hours.

On the other hand, as illustrated in FIG. 3, a copper reservoir having a recess of a length of 40 mm. a width of 20 mm. and a height of 5 mm. is provided and a melt of lead maintained at about 700° C. is fed to the reservoir at a rate of 15 g./min. so as to feed a copper-lead alloy having a copper content more than 2% by weight at the treatment temperature. As a result, the above-mentioned local corrosion of the supporting rod is greatly reduced and the life of the supporting rod is prolonged to about 16 hours, twice as long as in the case where the reservoir is not provided.

In the above-mentioned glass ribbon-modifying process, the molten alloy to be used has a different saturation concentration of the additive metal (a) depending on the degree of the treatment temperature. In general, as the treatment temperature rises the saturation concentration of the additive metal (a) rises. In accordance with this invention, as described above, the concentration of the additive metal (a) can be maintained at the saturation concentration or a concentration approximating the saturation concentration depending on the treatment temperature actually adopted, and the molten alloy containing the additive metal (a) at this high concentration is fed to the glass ribbon. Accordingly, the life of the supporting metal rod can be extremely prolonged and the exchange frequency of the supporting metal rod can be reduced, thus resulting in improved productivity.

Further, in this invention it is unnecessary to produce or purchase various kinds of solid materials for molten alloys having different additive metal concentration, and this invention is industrially advantageous in that a molten alloy of a maximum content of the additive metal suitable for the process conditions can always be fed onto the glass ribbon.

What I claim is:

1. In the process for the preparation of a surface modified glass ribbon comprising feeding molten glass on a bath of molten metal, continuously forwarding the glass in the form of a ribbon on the molten metal bath while keeping it in the plasticized condition, contacting the glass ribbon with a molten alloy disposed on the upper surface of the glass ribbon, said molten alloy being composed of (a) a glass surface modifying metal which does not melt at the temperatures necessary for the treatment of contacting the glass ribbon with the molten alloy, and (b) a metal which melts at the said contact treatment temperatures and is capable of dissolving the metal (a) therein at said temperatures, and passing an electric current through the glass between the molten alloy and the molten metal bath; wherein the improvement comprises feeding said metal (b) or an alloy of said metals (a) and (b) to a reservoir member disposed upstream of said molten alloy and close above the glass ribbon, at least the surface of the inner wall of said reservoir member being composed of said metal (a), allowing the metal (b) or the alloy of said metals (a) and (b) to remain in said reservoir member for a prescribed period of time to thereby melt the metal (a) from said reservoir member, and substantially saturating the metal (b) with the metal (a) and feeding the saturated alloy to the upper surface of glass ribbon, thereby replenishing said molten alloy with said saturated alloy.

2. An apparatus for preparing a surface modified glass ribbon which comprises a bath containing a molten metal for expanding molten glass in the form of a ribbon and supporting it thereon; a glass feeding mechanism for feeding the molten glass onto the bath of molten metal; a glass withdrawing mechanism for continuously forwarding the glass ribbon on the bath of molten metal and withdrawing the same from the bath of molten metal; a molten alloy supporting member disposed close above the upper surface of the glass ribbon on the bath of molten metal in the direction traversing the glass ribbon to confine a molten alloy therein and contact the same with the glass ribbon, said alloy being composed of (a) a glass surface modifying metal which does not melt at the temperature for contacting the glass ribbon with the molten alloy and (b) a metal which melts at said contact temperature and can dissolve the metal (a) therein; a reservoir, at least the surface portion of which is composed of said metal (a), said reservoir being located upstream of said supporting member and disposed close above the glass ribbon where a melt of the metal (b) or molten alloy of metals (a) and (b) is contacted for a prescribed period of time with said reservoir member to thereby melt out the metal (a) from the reservoir member into the melt or molten alloy and form a molten alloy having a metal (a) concentration higher than before said contact, which is then fed on the upper surface of the glass ribbon; a feeding mechanism for feeding the melt of the metal (b) or molten alloy of metals (a) and (b) to said reservoir member; electrodes connected with the molten alloy confined in said supporting member and the bath of molten metal, respectively; and an electric source for passing an electric current through the glass between said electrodes.

3. The improvement as described in claim 1 wherein the metal (a) is selected from the group consisting of manganese, chromium, iron, vanadium, cobalt, nickel, copper, silver, gold, silicon and titanium.

4. The improvement as described in claim 1 wherein the metal (b) is selected from the group consisting of lead, tin and bismuth.

5. The improvement as described in claim 1 wherein the glass ribbon is contacted with the molten alloy at a temperature ranging from 600 to 900° C.

References Cited
UNITED STATES PATENTS

| | | | |
|---|---|---|---|
| 3,544,437 | 12/1970 | Loukes et al. | 65—99 A X |
| 3,607,175 | 9/1971 | Robinson | 65—30 X |
| 3,630,702 | 12/1971 | Lawrenson | 65—30 |

ROBERT L. LINDSAY, Primary Examiner

U.S. Cl. X.R.

65—182 R; 204—130